United States Patent [19]
Lee et al.

[11] Patent Number: 6,106,768
[45] Date of Patent: Aug. 22, 2000

[54] MM-NI TYPE HYDROGEN STORAGE ALLOY FOR NI/MH SECONDARY CELL

[75] Inventors: Jai Young Lee; Kuk Jin Jang; Jae Han Jung; Dong Myung Kim; Ji Sang Yu; Sang Min Lee; Jeong Gun Park; Ho Lee, all of Taejeon, Rep. of Korea

[73] Assignee: Korea Advanced Institute of Science and Technology, Taejeon, Rep. of Korea

[21] Appl. No.: 09/080,137

[22] Filed: May 15, 1998

[30] Foreign Application Priority Data

May 28, 1997 [KR] Rep. of Korea ............ 97-21441

[51] Int. Cl.$^7$ .................................. C22C 30/00
[52] U.S. Cl. ............. 420/580; 420/900; 429/220; 429/221; 429/223; 429/224
[58] Field of Search .................. 420/580, 900; 429/220, 221, 223, 224

[56] References Cited

U.S. PATENT DOCUMENTS

| | | | |
|---|---|---|---|
| 5,512,385 | 4/1996 | Komori et al. | 429/101 |
| 5,738,953 | 4/1998 | Lichtenberg et al. | 429/59 |
| 5,916,519 | 6/1999 | Saito et al. | 420/455 |

OTHER PUBLICATIONS

T. Sakai et al., "Effects of Microencapsulation of Hydrogen Storage Alloy on the Performances of Sealed Nickel/Metal Hyride Batteries," *J. Electrochem Soc.,* Mar. 1987, pp. 558–562.

J. J. G. Willems et al., "From Permanent Magnets to Rechargeable Hydride Electrodes," *Journal Of the Less–Common Metals*, vol. 129, 1987, pp. 13–30.

T. Sakai et al., "Rare–earth–based alloy elctrodes for a nickel–metal hydride battery," *Journal of the Less–Common Metals*, vol. 172–174, 1991, pp. 1175–1184.

*Primary Examiner*—Ngoclan Mai
*Attorney, Agent, or Firm*—Hickman Stephens Coleman & Hughes, LLP

[57] ABSTRACT

There are disclosed Mm/Ni type hydrogen storage alloys for Ni/MH secondary cells. The alloys which allow the cells to be of high performance and high capacity can be prepared at lower costs than the production costs of conventional Co-rich hydrogen storage alloys, by reducing the amount of the Co element. The Co element is partially or wholly replaced by by Cr, Cu, Fe, Zn and/or Zi, which are each known to be of stronger affinity for hydrogen than is Co and to have such a strong oxidation tendency in electrolytes as to form a highly dense oxide. The novel alloys have discharge capacities and electrode life span as good as those of the conventional Co-rich hydrogen storage alloys but have advantages over the Co-rich alloys, including performance-to-cost.

2 Claims, 7 Drawing Sheets

MM-NI TYPE HYDROGEN STORAGE ALLOY FOR NI/MH SECONDARY CELL

BACKGROUND OF THE INVENTION

1. Field of the Invention

The present invention relates to a novel Mm—Ni type hydrogen storage alloy for Ni/MH (metal hydride) secondary cells. More particularly, the present invention relates to an Mm—Ni type hydrogen storage alloy which is of low production cost with high performance and high discharge capacity.

2. Description of the Prior Art

Hydrogen storage alloys are the metals or alloys which are able to absorb or discharge hydrogen reversibly at certain temperatures under certain pressures. In order for the hydrogen storage alloys to be applied in practice, they are required to show large hydrogen storage capacities which are reversibly available as well as to show long electrode life spans in electrolytes.

The hydrogen storage alloys for Ni/MH secondary cell, developed thus far, can be exemplified largely by two types: $AB_5$ type including Mm—Ni, wherein A is an element having a high affinity for hydrogen, that is, a rare-earth element, such as La, Ce, Pr, Nd, etc, and B is a transition metal qt transition metals selected from Ni, Mn, Co, Fe, Al, etc; and $AB_2$ type including Zr—Ni and Ti—Ni. The former $AB_5$ type is disadvantageous in that its energy storage density is low while the latter $AB_2$ type is poor in almost all of its functions. Thus, in order to develop the Ni/NH secondary cells which are of high capacity and high performance, it is necessary to research for the high capacity and the long electrode life span of $AB_5$ type hydrogen storage alloys for which higher performances are secured than for $AB_2$ type hydrogen storage alloys.

Recently, extensive research has been directed to the development of the anode materials for Ni/MH secondary cells. In most case, the research was focused on $AB_5$ type hydrogen storage alloys and resulted in $MmNi_5$ type alloys with an electrochemical discharge capacity of about 200–300 mAh/g.

However, the miniaturization of electronic equipment requires alloys which are of higher discharge capacity and better electrode life span than the conventional $MmNi_5$ type alloys. This requirement is also raised by the development of electric vehicles which demand high capacity and high performance batteries.

In addition, the development of other types of high-grade cells, together with the expansion of the secondary cell market, compels the production cost of conventional Ni/MH to be reduced.

It is reported in J. Less-Common. Met., 129 (19897) 1 by J. J. Wilem et al. that, when Co is used instead of the Ni of La—Nd—Ni type hydrogen storage alloy electrodes, the resulting alloy electrodes have long life spans because the cobalt-substituted alloys are lowered in pulverization rate.

A similar report is disclosed in J. Less-Common Metal., 172–174 (1991) 1175 by T. Sakai et al. in which the improvement in the life spans of Mm—Ni—Al—Mn hydrogen storage alloy electrodes can be also achieved through the replacement of Co for Ni.

However, the supra alloys suggested are more expensive than the conventional metal alloys. Further, the major element Co shows a low affinity for hydrogen, resulting in high production cost and low discharge capacity.

T. Sakai et al., continued to conduct research for improvement in the life spans of $AB_5$ type hydrogen storage alloy electrodes without deteriorating their discharge capacities and reported in J. Electrochemical Society, Vol. 134, No. 3, (1987) 558 that the life spans of $AB_5$ type hydrogen storage alloy electrode could be extended by electroless plating Cu and Ni on alloy powders. The electroless plating processes suggested by T. Sakai et al., however, are difficult to put into practice because the additional processes produce pollution of the environment as well as increase the production cost. What is worse, the improvement in the life span is less effected by the non-electrolyte plating than by the Co replacement.

As mentioned above, the life span of electrodes in electrolyte, which has been one of the hottest issues in $AB_5$ type hydrogen storage alloy art, can be extended by a decrease in the pulverization rate of the alloy, which is accomplished by the substitution of the Co element to the alloy.

The composition of a commercially available Mm type hydrogen storage alloy is given as shown in Table 1, below.

TABLE 1

| Elements in a conventional Mishi metal-based Hydrogen Storage Alloy | | | |
|---|---|---|---|
| Elements | Unit Price ($/lb) | Content (wt %) | Cost Share (%) |
| Mm | 4.0 | 33 | 23 |
| Ni | 3.5 | 50 | 30 |
| Co | 28.0 | 20 | 47 |
| Mn | 0.7 | 5 | <1 |
| Al | 0.6 | 2 | <1 |

The Mm type hydrogen storage alloy of Table 1 comprises 10% by weight of Co and can be represented by $MmNi_{3.55}Co_{0.75}Mn_{0.4}Al_{0.3}$. This commercially available alloy can give the electrode an extended life span by virtue of its large Co fraction but gives rise to an increase in production cost: the Co element amounts to 47% in cost share.

SUMMARY OF THE INVENTION

Therefore, it is an object of the present invention to overcome the above problems encountered in prior arts and to provide an Mm—Ni type hydrogen storage alloy for Ni/MH secondary cells, which shows a high discharge capacity with a long life span.

It is another object of the present invention to provide an Mm—Ni type hydrogen storage alloy for Ni/MH secondary cells, which can be produced at low costs.

In accordance with an aspect of the present invention, there is provided an Mm—Ni type hydrogen storage alloy for secondary cells, comprising Mm, Ni, Co, Mn and Al in combination with at least one element selected from the group consisting of Cr, Cu, Zn, Sn, Si, Fe, V, Zr and Ti.

In accordance with another aspect of the present invention, there is provided an Mm—Ni type hydrogen storage alloy for secondary cells, comprising Mm, Ni, Mn and Al in combination with at least one element selected from the group consisting of Cr, Cu, Zn, Zn, Si, V, Zr and Ti.

BRIEF DESCRIPTION OF THE DRAWINGS

Other objects and aspects of the invention will become apparent from the following description of embodiments with reference to the accompanying drawings in which.

DETAILED DESCRIPTION OF THE INVENTION

The present invention pertains to alloys which allow the electrodes to have longer life spans than those of the conventional alloys in spite of a little or no Co content and which can be produced at low costs.

The application of the preferred embodiments of the present invention is best understood with reference to the accompanying drawings.

Figure 1:
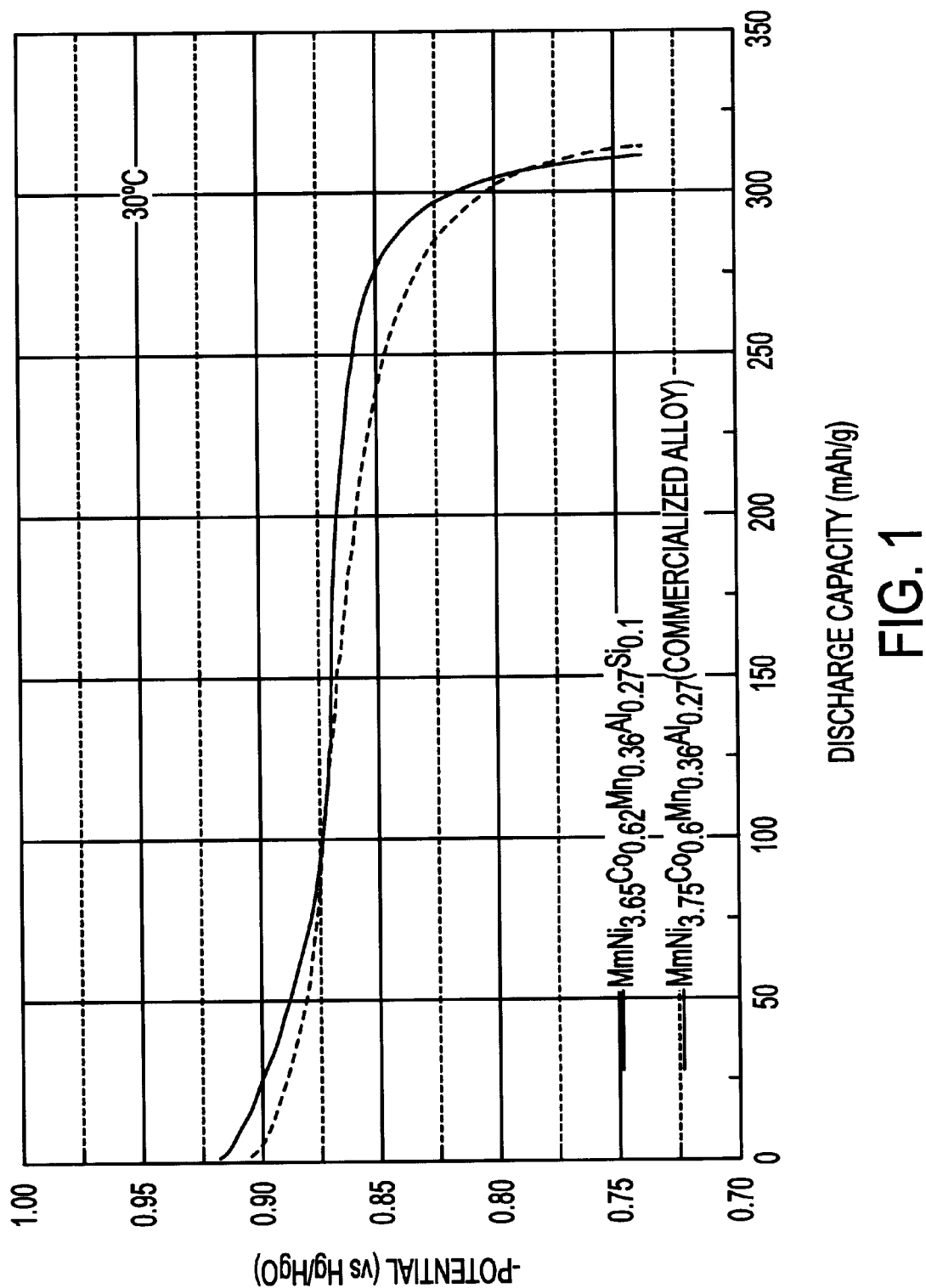
FIG. 1 shows the potentials of an $MmNi_{3.65}Co_{0.62}Mn_{0.36}Al_{0.27}Si_{0.1}$ alloy electrode and an $MmNi_{3.75}Co_{0.6}Mn_{0.36}Al_{0.27}$ alloy electrode which are plotted with regard to discharge capacity at a discharge current density of 100 mA/g.

First, referring to FIG. 1, the potentials of a novel -hydrogen storage alloy electrode $MmNi_{3.65}Co_{0.62}Mn_{0.36}Al_{0.27}Si_{0.1}$ and a commercialized alloy electrode $MmNi_{3.75}Co_{0.6}Mn_{0.36}Al_{0.27}$ are plotted with regard to discharge capacity at a discharge current density of 0.2C rate. As compared with that of the commercialized alloy, the discharge curve of the Si-replaced alloy electrode has only a little change with a little more flat plateau in which middle potentials are slightly increased.

Figure 2:
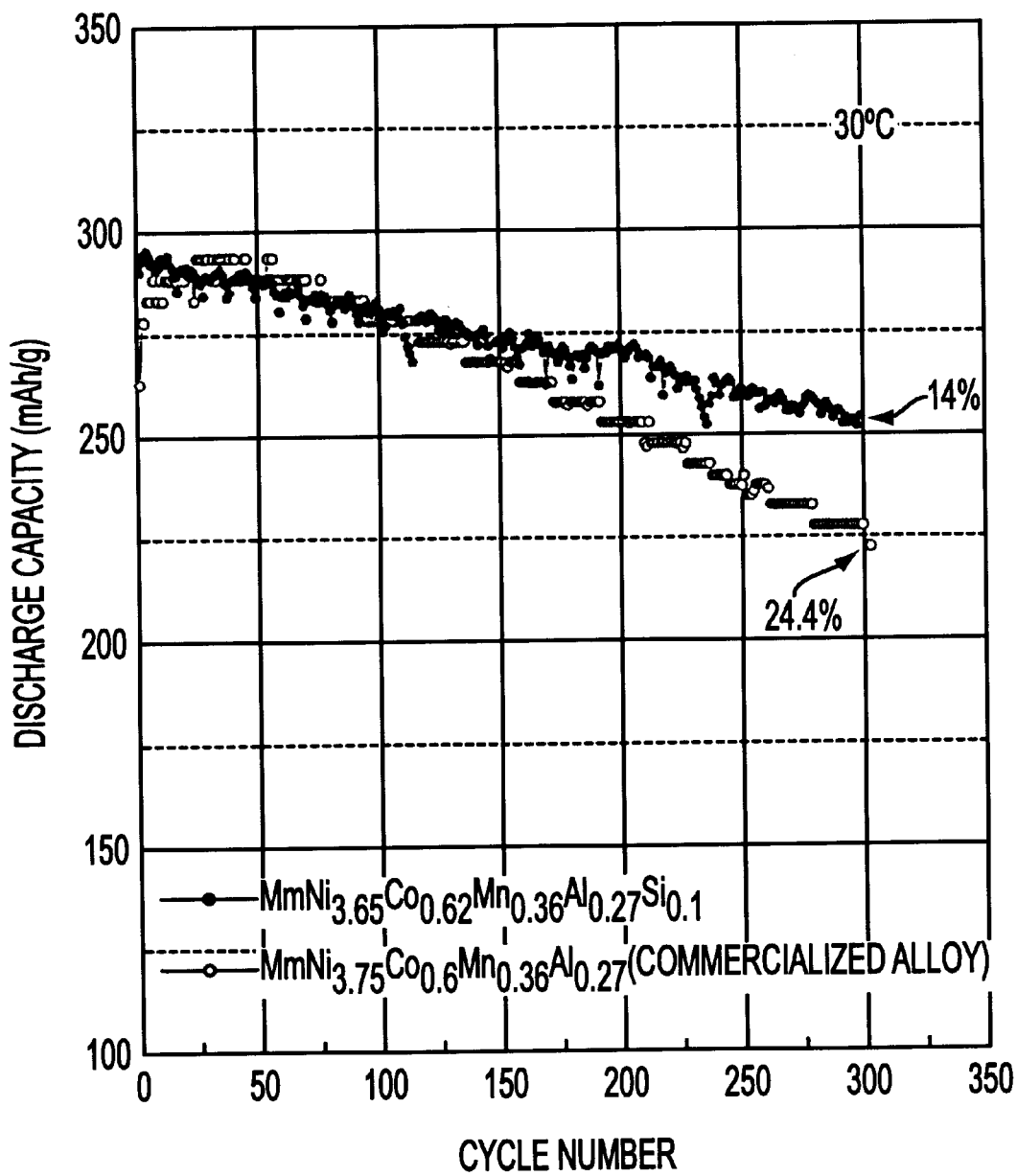
FIG. 2 shows the change of discharge capacity with the charge and discharge cycles in an $MmNi_{3.65}Co_{0.62}Mn_{0.36}Al_{0.27}Si_{0.1}$ electrode and an $MmNi_{3.75}Co_{0.6}Mn_{0.36}Al_{0.27}$ electrode.

FIG. 2 shows the change of discharge capacity with the charge and discharge cycles in the novel $MmNi_{3.65}Co_{0.62}Mn_{0.36}Al_{0.27}Si_{0.1}$ electrode and the commercialized $MmNi_{3.75}Co_{0.6}Mn_{0.36}Al_{0.27}$ electrode. The novel alloy electrode (Si-replaced alloy electrode) is almost similar to the commercialized alloy electrode in discharge capacity within the charge and discharge cycling of 150 rounds, but after the 300th cycling, the novel alloy electrode has a discharge capacity only 14% lower than its initial value whereas the commercialized alloy electrode has a 24.4% lower discharge capacity than its initial value. This data shows that the novel alloy electrode of the present invention is significantly improved in life span, compared with the conventional alloy electrode.

Figure 3:
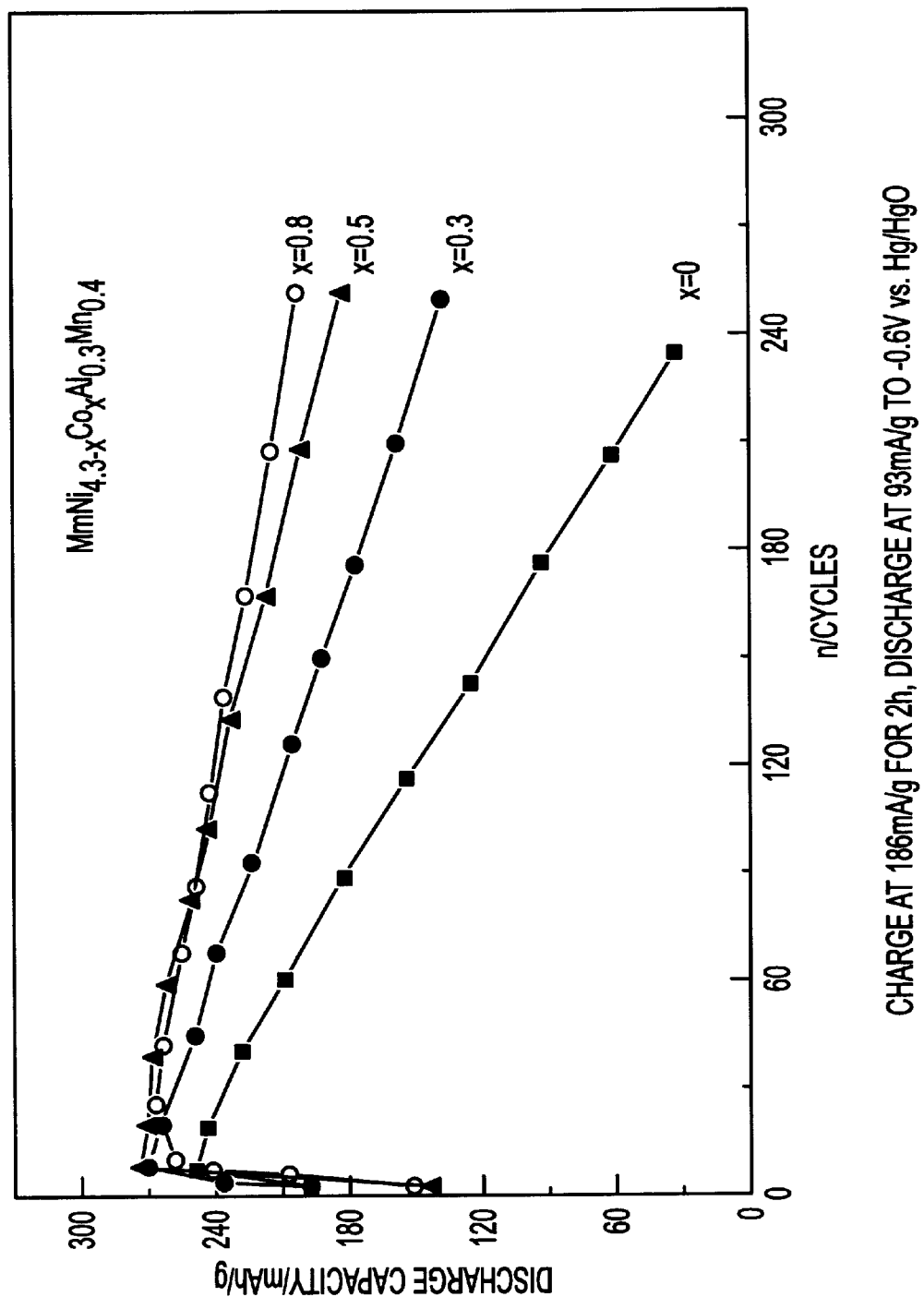
FIG. 3 is a plot showing the discharge capability of $MmNi_{4.3-x}Co_xAl_{0.3}Mn_{0.4}$ electrode with respect to the number of charge and discharge cycle, depending on x.

With reference to FIG. 3, the discharge capacity of $MmNi_{4.3-x}Co_xAl_{0.3}Mn_{0.4}$ electrode is plotted with respect to the number of charge and discharge cycle, depending on x. The discharge capacity of the electrode in electrolyte is decreased as X is increased because more Co-substituted alloy has lower hydrogen storage capacity in gas-solid reaction, but the decay rate is slower during electrochemical cycling as as x is higher. Consequently, the replacement of Co for Ni brings about an improvement in the life span of the electrode, which is attributed, as reported by Sakai et al., to the fact that Co element lowers the pulverization rate of the hydrogen storage alloy upon hydrogenation.

The present inventors made many attempts to reduce the amount of Co, a main cost-determining factor, from the alloy while maintaining the discharge capacity and the life span of the alloy and found that, when the Co was partially or wholly replaced by Cr, Cu, Fe, Zn and/or Si, each being known to be of stronger affinity for hydrogen than is Co and to have such a strong oxidation tendency in electrolytes as to form a highly dense oxide, positive effects could be obtained.

Figure 4:
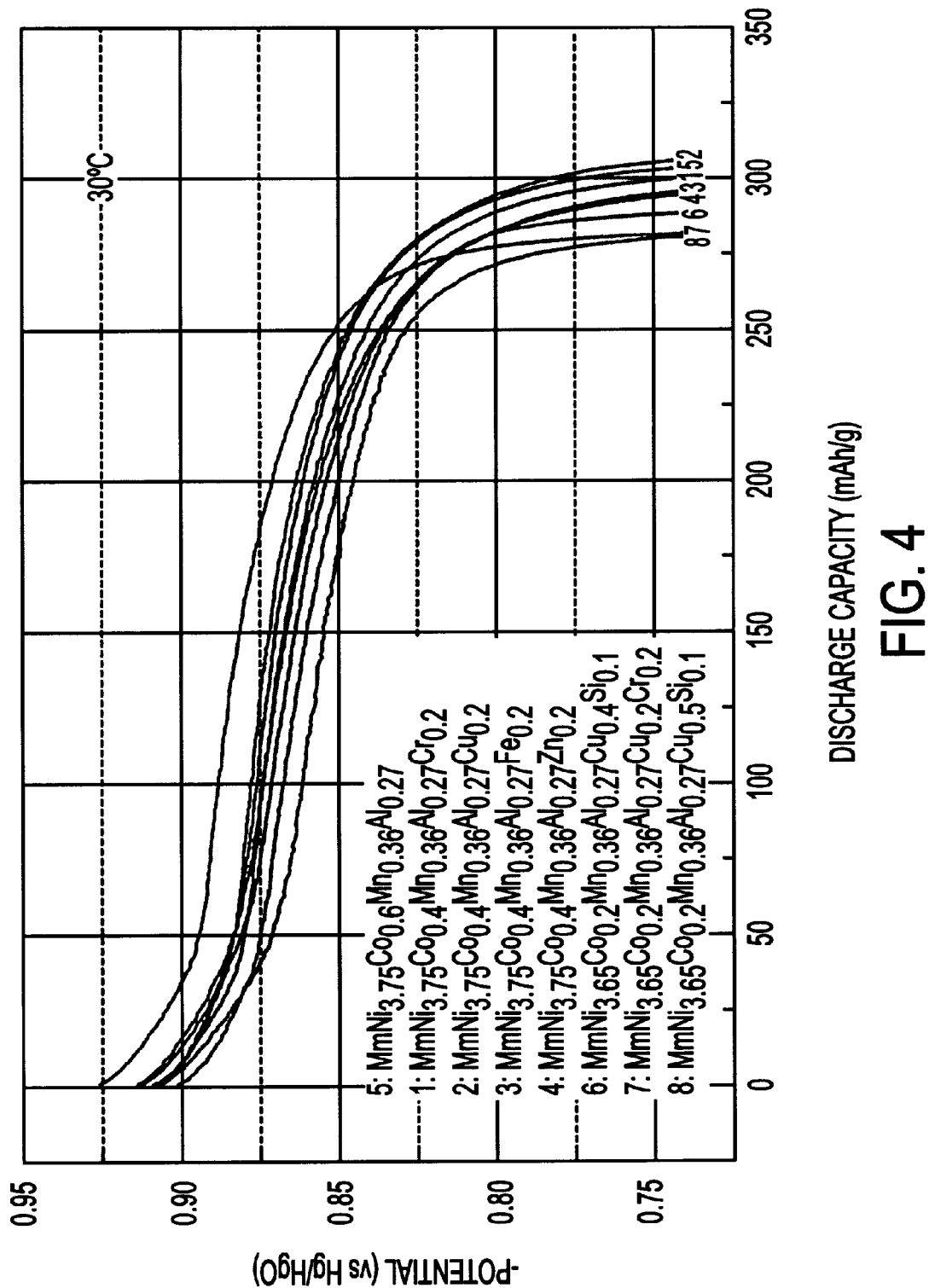
FIG. 4 shows the effects of Cr, Cu, Fe, Zn and Si element on the discharge capacity of $MmNi_{3.75}Co_{0.6}Mn_{0.36}Al_{0.27}$ when the Co element is partially or wholly replaced by the elements.

FIG. 4 is a result of such replacement effects. As compared with the discharge capacity of an $MmNi_{3.75}Co_{0.6}Mn_{0.36}Al_{0.27}$ alloy electrode control, the discharge capacity was 310 mAh/g when the Co was partially replaced by Cr or Cu (Co=0.4) and 175–295 mAh/g for Co=0.2. In the latter case, the discharge capacity is slightly lower than that of the commercialized hydrogen storage alloy electrode but excellent performance-to-cost could be obtained.

Figure 5:
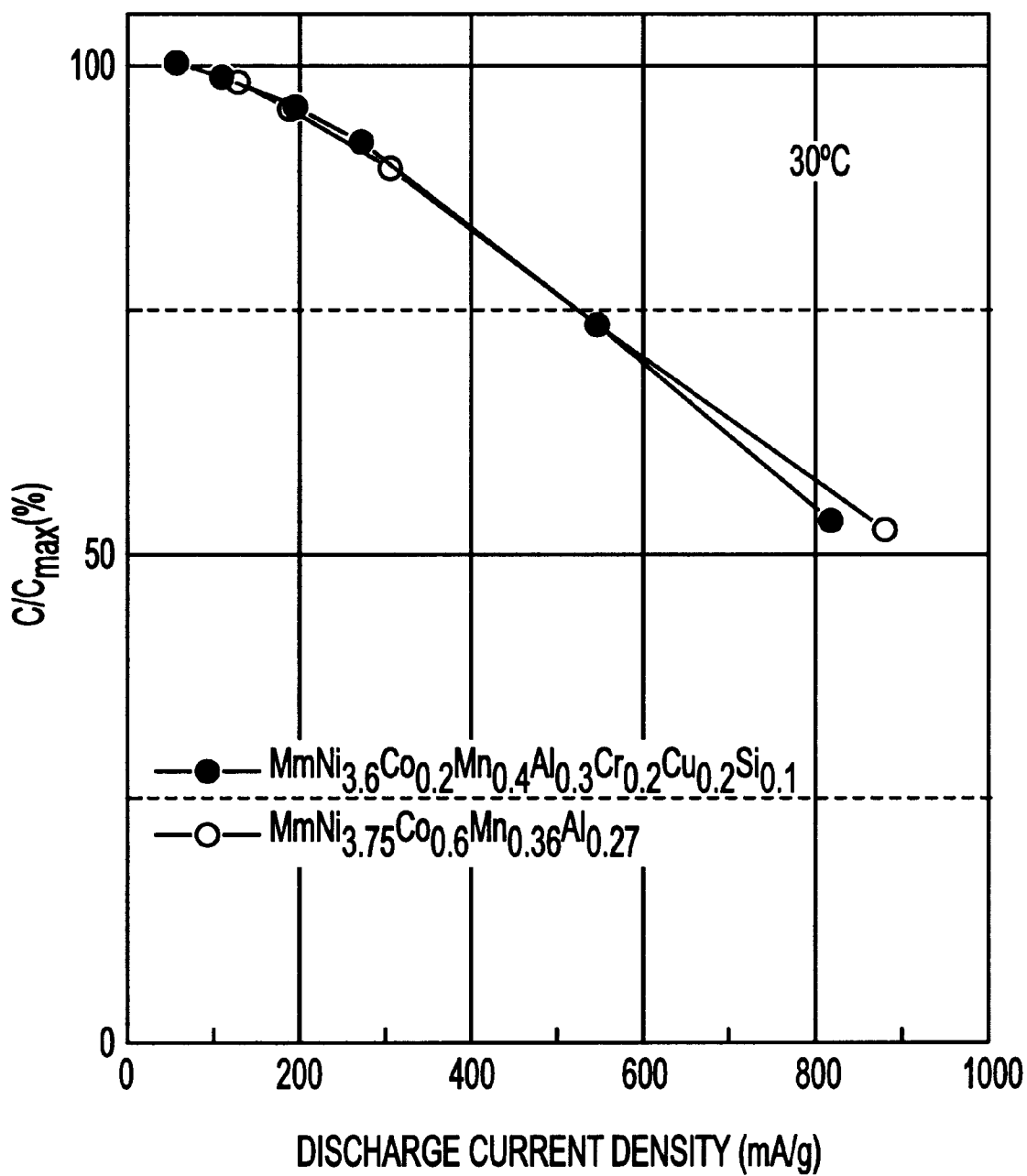
FIG. 5 shows the rate capabilities of an $MmNi_{3.6}Co_{0.2}Mn_{0.4}Al_{0.3}Cr_{0.2}Cu_{0.2}Si_{0.1}$ hydrogen storage alloy electrode and an $MmNi_{3.75}Co_{0.6}Mn_{0.36}Al_{0.27}$ hydrogen storage alloy electrode, which are plotted with respect to discharge current density.

With reference to FIG. 5, the rate capacity of an $MmNi_{3.6}Co_{0.2}Mn_{0.4}Al_{0.3}Cr_{0.2}Cu_{0.2}Si_{0.1}$ hydrogen storage alloy electrode is plotted with respect to discharge current density, together with the rate capacity of an $MmNi_{3.75}Co_{0.6}Mn_{0.36}Al_{0.27}$ hydrogen storage alloy electrode. As seen, the hydrogen storage alloy electrode of the present invention has almost identical rate capacity to that of the commercialized hydrogen alloy electrode.

Figure 6:
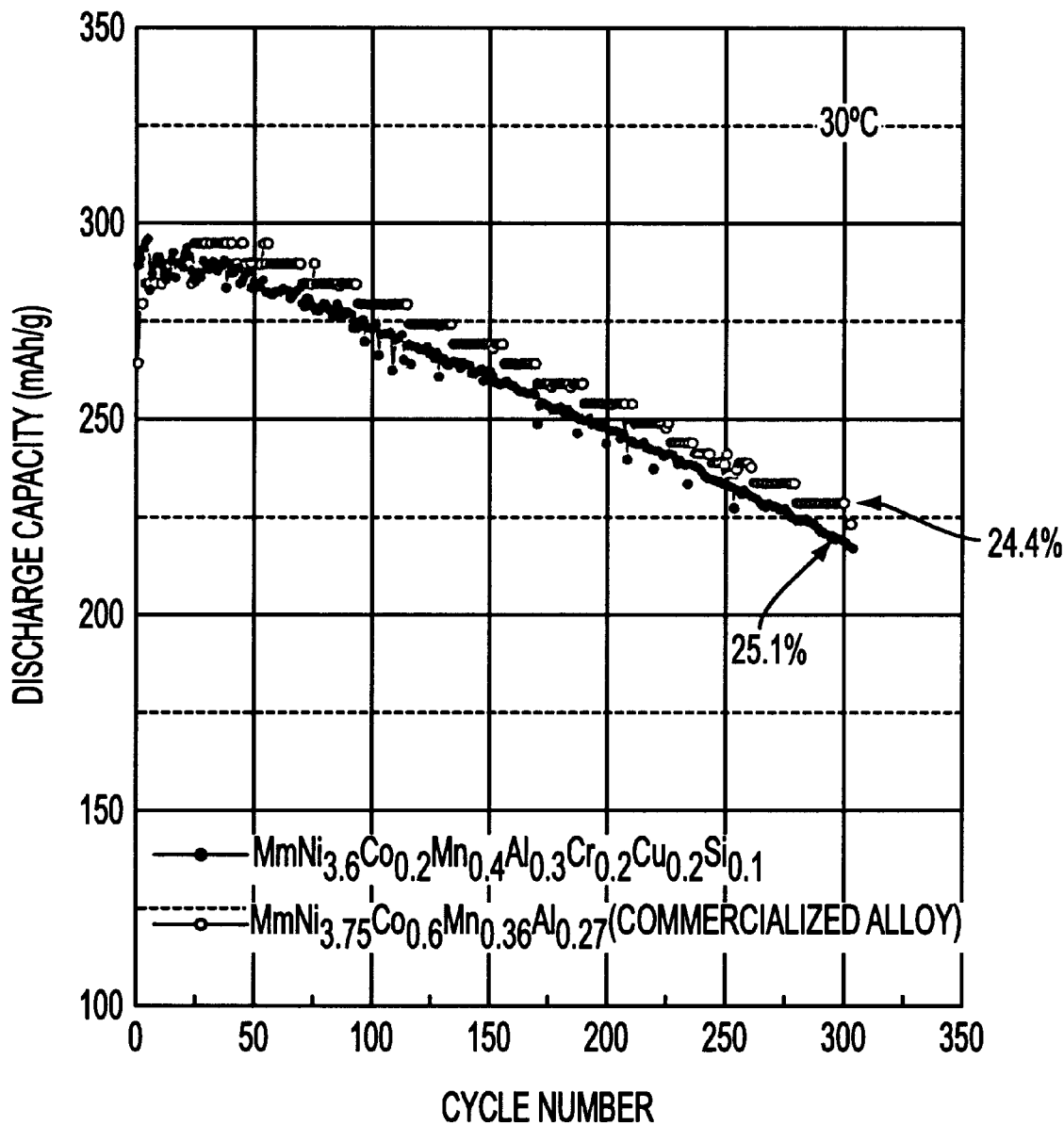
FIG. 6 shows the change of discharge capacity with the charge and discharge cycles in the $MmNi_{3.75}Co_{0.6}Mn_{0.36}Al_{0.27}$ electrode and the $MmNi_{3.6}Co_{0.2}Mn_{0.4}Al_{0.3}Cr_{0.2}Cu_{0.2}Si_{0.1}$ electrode.

FIG. 6 shows the change of discharge capacity with the charge and discharge cycles in the $MmNi_{3.75}Co_{0.6}Mn_{0.36}Al_{0.27}$ electrode and the $MmNi_{3.6}Co_{0.2}Mn_{0.4}Al_{0.3}Cr_{0.2}Cu_{0.2}Si_{0.1}$ electrode. The data of this figure show that the alloy electrode of Co=0.2 is almost identical to the commercialized alloy electrode in discharge capacity and life span but can be produced at a much lower cost.

Figure 7:
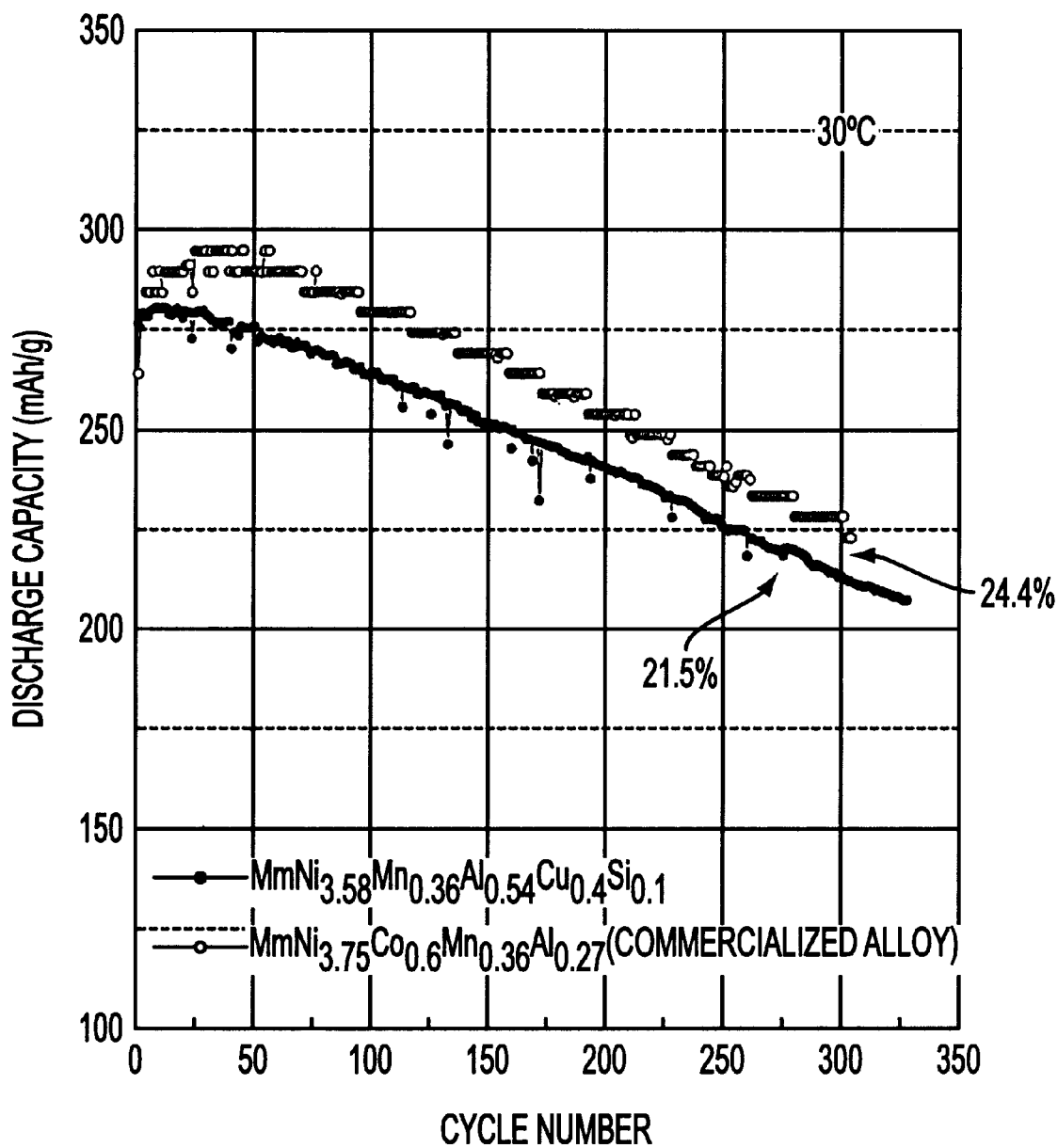
FIG. 7 shows the change of discharge capacity with the charge and discharge cycles in an $MmNi_{3.58}Mn_{0.36}Al_{0.54}Cu_{0.4}Si_{0.4}$ alloy electrode.

FIG. 7 shows the change of discharge capacity with the charge and discharge cycles in a Co-free $AB_5$ type hydrogen storage alloy electrode and the commercialized $MmNi_{3.75}Co_{0.6}Mn_{0.36}Al_{0.27}$ alloy electrode. As compared with the commercialized electrode, the Co-free alloy electrode is a little low in discharge capacity but almost identical or slightly improved in life span. Therefore, $MmNi_{3.58}Mn_{0.36}Al_{0.54}Cu_{0.4}Si_{0.1}$ is a very promising alloy to reduce the production cost.

The discharge capacities of Mishi metal hydrogen storage alloy electordes according to their compositions are given as shown in the Table 2, below.

TABLE 2

| Co-containing alloys | |
| --- | --- |
| $MmNi_{3.55}Co_{0.75}Mn_{0.4}Al_{0.3}$ | 295 |
| $MmNi_{3.75}Co_{0.6}Mn_{0.36}Al_{0.27}$ | 311 |
| $MmNi_{3.65}Co_{0.62}Mn_{0.36}Al_{0.27}Si_{0.1}$ | 305 |
| $MmNi_{3.75}Co_{0.62}Mn_{0.36}Al_{0.27}V_{0.1}$ | 295 |
| $MmNi_{3.75}Co_{0.62}Mn_{0.36}Al_{0.27}V_{0.05}$ | 287 |
| $MmNi_{3.75}Co_{0.62}Mn_{0.36}Al_{0.2}Si_{0.1}$ | 290 |
| $MmNi_{3.75}Co_{0.62}Mn_{0.36}Al_{0.27}Cu_{0.1}Si_{0.1}$ | 285 |
| $MmNi_{3.75}Co_{0.62}Mn_{0.36}Al_{0.27}Cu_{0.5}Si_{0.1}$ | 267 |
| $MmNi_{3.75}Co_{0.42}Mn_{0.36}Al_{0.27}Cr_{0.2}$ | 290 |

TABLE 2-continued

| | |
|---|---|
| $MmNi_{3.75}Co_{0.42}Mn_{0.36}Al_{0.27}Cu_{0.2}$ | 304 |
| $MmNi_{3.75}Co_{0.42}Mn_{0.36}Al_{0.27}Fe_{0.2}$ | 298 |
| $MmNi_{3.75}Co_{0.42}Mn_{0.36}Al_{0.27}Zn_{0.2}$ | 291 |
| $Mm_{0.95}Zr_{0.05}Ni_{3.6}Co_{0.2}Mn_{0.4}Al_{0.3}Cr_{0.2}Cu_{0.2}Si_{0.1}$ | 290 |
| $MmNi_{3.65}Co_{0.2}Mn_{0.36}Al_{0.27}Cu_{0.4}Si_{0.1}$ | 285 |
| $MmNi_{3.6}Co_{0.2}Mn_{0.36}Al_{0.27}Cr_{0.2}Cu_{0.2}Si_{0.1}$ | 295 |
| $MmNi_{3.65}Co_{0.2}Mn_{0.36}Al_{0.27}Cu_{0.5}Si_{0.1}$ | 265 |
| $MmNi_{3.65}Co_{0.2}Mn_{0.36}Al_{0.27}Cu_{0.6}Si_{0.1}$ | 245 |
| Co-free alloys | |
| | |
| $MmNi_{4.35}Mn_{0.36}Al_{0.27}$ | 310 |
| $MmNi_{3.85}Mn_{0.36}Al_{0.27}V_{0.5}$ | 225 |
| $MmNi_{4.05}Mn_{0.36}Al_{0.27}V_{0.3}$ | 245 |
| $MmNi_{4.25}Mn_{0.36}Al_{0.27}V_{0.1}$ | 310 |
| $MmNi_{4.25}Mn_{0.36}Al_{0.27}Sn_{0.1}$ | 295 |
| $MmNi_{4.25}Mn_{0.36}Al_{0.27}Sn_{0.1}$ | 295 |
| $MmNi_{4.25}Mn_{0.36}Al_{0.27}Sn_{0.2}$ | 270 |
| $Mm_{0.9}Zr_{0.05}Ti_{0.05}Ni_{3.76}Mn_{0.41}Al_{0.27}Cr_{0.3}Cu_{0.2}Zn_{0.05}$ | 270 |
| $Mm_{0.9}Zr_{0.09}Ti_{0.01}Ni_{3.91}Mn_{0.42}Al_{0.32}Cr_{0.3}V_{0.04}$ | 270 |
| $Mm_{0.95}Ti_{0.05}Ni_{3.8}Mn_{0.4}Al_{0.3}Cr_{0.2}Cu_{0.2}Si_{0.1}$ | 280 |
| $MmNi_{4.05}Mn_{0.36}Al_{0.27}Cu_{0.2}Si_{0.1}$ | 285 |
| $MmNi_{3.85}Mn_{0.36}Al_{0.27}Cu_{0.4}Si_{0.1}$ | 278 |
| $MmNi_{3.58}Mn_{0.36}Al_{0.54}Cu_{0.4}Si_{0.1}$ | 282 |
| $MmNi_{3.25}Mn_{0.36}Al_{0.27}Cu_{1.0}Si_{0.1}$ | 265 |
| $MmNi_{3.8}Mn_{0.4}Al_{0.3}Cr_{0.2}Cu_{0.2}Si_{0.1}$ | 268 |
| $Mm_{0.95}Zr_{0.05}Ni_{3.8}Mn_{0.4}Al_{0.3}Cr_{0.2}Cu_{0.2}Si_{0.1}$ | 260 |
| $Mm_{0.9}Zr_{0.09}Ti_{0.01}Ni_{3.66}Mn_{0.42}Al_{0.27}Cr_{0.3}V_{0.046}$ | 255 |
| $Mm_{0.9}Zr_{0.09}Ti_{0.01}Ni_{3.76}Mn_{0.47}Al_{0.27}Cr_{0.3}V_{0.04}$ | 255 |
| $Mm_{0.9}Zr_{0.05}Ti_{0.05}Ni_{3.71}Mn_{0.41}Al_{0.27}Cr_{0.2}Cu_{0.2}Zn_{0.05}$ | 275 |
| $MmNi_{3.8}Mn_{0.36}Al_{0.54}Cu_{0.2}Si_{0.1}$ | 255 |

A better understanding of the present invention may be obtained in light of the following examples which are set forth to illustrate, but are not to be construed to limit, the present invention.

EXAMPLE I

Two alloys were designed to have the compositions of $MmNi_{3.65}Mn_{0.36}Al_{0.27}Si_{0.1}$ and $MmNi_{3.6}Mn_{0.4}Al_{0.3}Cr_{0.2}Cu_{0.2}Si_{0.1}$. The alloys were prepared by arc-melting under an Ar atmosphere. The composition of the Mishi metal used in the alloys is given in Table, below.

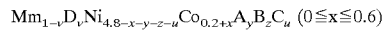

| | | | | Other Rare-earth metals |
|---|---|---|---|---|
| Elements | La | Ce | Pr | Nd | Si, Fe, Mg, Ca |
| Mole % | 63.0 | 17.4 | 10.68 | 2.24 | 6.68 |

The button type specimens prepared were pulverized in the air and were sieved to select the powders in a size of 325–400 mesh. 0.2 g of the powders were subjected to an electrode test. In preparing an electrode, alloy powders only were mixed with Cu powder in the weight ratio of 1:0.25 without using a binder. Finally, the mixed electrode powders were cold-pressed at a pressure of 10 ton/cm² to give pellets.

The pellets were subjected to half cell testing. After being charged at a charge current density of 0.2 C(60–70 mA/g) rate for 8 hrs, the discharge behavior (discharge capacity) of the alloy electrodes was observed until the cells discharged at a discharge current density of 0.2 C rate to an end potential of −0.75 V(vs Hg/HgO). To determine the life spans of the alloy electrodes, they were charged at a charge current density of 1.0 C (250–300 mA/g) rate for 1.5 hours and then, discharged at a discharge current density of 1.0 C rate.

The data obtained from the tests show that the alloys are almost identical to the conventional alloys in discharge capacity and electrode life span.

EXAMPLE II

A Co-free alloy $MmNi_{3.58}Mn_{0.36}Al_{0.54}Cu_{0.4}Si_{0.1}$ was designed. The alloy preparation and the electrode performance tests were carried out in the same conditions as Example I. The alloy was a little lower in discharge capacity than the conventional commercialized alloys but had almost the same electrode life span with them. Thus, the alloy of the present invention is consequently of a superior performance-to-cost ratio because it comprises no Co, a main cost-determining factor.

As described hereinbefore, the hydrogen storage alloys for Ni/MH secondary cells have discharge capacities and performances as good as those of the conventional Co-rich hydrogen storage alloys. However, the alloys of the present invention have advantages over the Co-rich alloys, including performance-to-cost. Therefore, the present invention can give a contribution to the use expansion of Ni/MH secondary cells and to the development of the electric vehicles whose performance is greatly determined by the performance and the capacity of secondary cells.

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. An Mm—Ni type hydrogen storage alloy for secondary cells, said alloy represented by the following formula:

$$Mm_{1-v}D_vNi_{4.8-x-y-z-u}Co_{0.2+x}A_yB_zC_u \quad (0 \leq x \leq 0.6)$$

wherein, A=Cr, Cu or Zn (0≦y<0.8);

B=Mn, Sn, or Si (0<z<1);

C=Al or V (0<u<0.3); and

D=Zr or Ti (0≦v≦1).

2. An Mm—Ni type hydrogen storage alloy for secondary cells, represented by the following formula:

$$Mm_{1-u}D_uNi_{5-x-y-z}A_xB_yC_z$$

wherein, A=Cr, Cu or Zn (0≦x<0.6);

B=Mn, Sn or Si (0<y<0.6);

C=Al or V (0<z<0.6); and

D=Zr or Ti(0≦u≦1).

* * * * *